US012476906B2

(12) United States Patent
Komath et al.

(10) Patent No.: US 12,476,906 B2
(45) Date of Patent: Nov. 18, 2025

(54) LABEL DISTRIBUTION PROTOCOL (LDP) CONVERGENCE IN RING TOPOLOGIES

(71) Applicant: Ciena Corporation, Hanover, MD (US)

(72) Inventors: Bindhia Komath, Sunnyvale, CA (US); Muthurajah Sivabalan, Ottawa (CA); Wade Miller, Cheney, WA (US); Tao Wang, Ottawa (CA); Sami Boutros, Union City, CA (US)

(73) Assignee: Ciena Corporation, Hanover, MD (US)

( * ) Notice: Subject to any disclaimer, the term of this patent is extended or adjusted under 35 U.S.C. 154(b) by 471 days.

(21) Appl. No.: 17/841,728

(22) Filed: Jun. 16, 2022

(65) Prior Publication Data

US 2023/0412500 A1 Dec. 21, 2023

(51) Int. Cl.
*H04L 45/50* (2022.01)
*H04B 10/2575* (2013.01)
*H04B 10/275* (2013.01)
*H04L 12/46* (2006.01)
(Continued)

(52) U.S. Cl.
CPC ........ *H04L 45/507* (2013.01); *H04L 12/4637* (2013.01); *H04L 45/02* (2013.01); *H04L 45/22* (2013.01); *H04B 10/25755* (2013.01); *H04B 10/275* (2013.01)

(58) Field of Classification Search
CPC ... H04L 45/507; H04L 12/4637; H04L 45/02; H04L 45/22; H04L 12/437; H04L 45/50; H04B 10/25755; H04B 10/275
See application file for complete search history.

(56) References Cited

U.S. PATENT DOCUMENTS

| 7,120,792 B1 | 10/2006 | Jacobson et al. |
| 7,197,573 B1 | 3/2007 | Jacobson et al. |
| 7,430,176 B2 | 9/2008 | Nalawade et al. |
| (Continued) | | |

FOREIGN PATENT DOCUMENTS

| EP | 2 963 872 A1 | 1/2016 |
| EP | 3 038 301 B1 | 3/2020 |
| WO | 2021/0967231 A1 | 4/2021 |

OTHER PUBLICATIONS

Sep. 14, 2023, International Search Report and Written Opinion for International Application No. PCT/US2023/025553.

*Primary Examiner* — Gary Mui
*Assistant Examiner* — Yewon Kim
(74) *Attorney, Agent, or Firm* — Baratta Law PLLC; Lawrence A. Baratta, Jr.

(57) ABSTRACT

A method implemented by a node in a network utilizing Multiprotocol Label Switching (MPLS) includes performing a convergence procedure to discover the topology of a network in which multiple nodes are arranged; and upon determining that the topology of the network is a ring topology whereby the node is connected to two neighboring nodes by a respective link, creating a first table for a first link, the first table including labels representing at least a portion of a label stack for allowing the node to transmit packets to another node in the network in a clockwise (CW) direction around the ring; and creating a second table for a second link, the second table including labels representing at least a portion of a label stack for allowing the node to transmit packets to another node in the network in an anti-clockwise (ACW) direction around the ring.

20 Claims, 5 Drawing Sheets

(51) Int. Cl.
*H04L 45/00* (2022.01)
*H04L 45/02* (2022.01)

(56) References Cited

U.S. PATENT DOCUMENTS

| | | |
|---|---|---|
| 7,539,191 B1 | 5/2009 | Jacobson |
| 7,684,351 B2 | 3/2010 | Vasseur et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |
| 8,824,331 B1 | 9/2014 | Alaettinoglu et al. |
| 8,937,946 B1 | 1/2015 | Kanna et al. |
| 9,178,811 B2 * | 11/2015 | Li .................. H04L 12/433 |
| 9,979,629 B2 | 5/2018 | Sivabalan et al. |
| 10,033,623 B2 | 7/2018 | Jain et al. |
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,740,408 B2 | 8/2020 | Ramasamy et al. |
| 10,833,976 B2 | 11/2020 | Saad et al. |
| 10,868,755 B2 | 12/2020 | Filsfils et al. |
| 11,057,278 B1 | 7/2021 | Côté et al. |
| 2007/0237072 A1 | 10/2007 | Scholl |
| 2014/0204946 A1 * | 7/2014 | Li ........................ H04L 45/50 370/392 |
| 2015/0271034 A1 | 9/2015 | Kanna et al. |
| 2015/0381408 A1 * | 12/2015 | Kompella ............ H04L 45/22 370/222 |
| 2016/0057049 A1 | 2/2016 | Jacobson et al. |
| 2016/0191324 A1 | 6/2016 | Olofsson et al. |
| 2017/0134268 A1 * | 5/2017 | Easale ..................... H04L 12/42 |
| 2019/0297017 A1 | 9/2019 | Pignataro et al. |
| 2019/0379601 A1 | 12/2019 | Khan et al. |
| 2020/0112495 A1 | 4/2020 | Attarwala et al. |
| 2020/0153856 A1 | 5/2020 | Nainar et al. |
| 2020/0220811 A1 | 7/2020 | Shah |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |

\* cited by examiner

LABEL DISTRIBUTION PROTOCOL (LDP) CONVERGENCE IN RING TOPOLOGIES

FIELD OF THE DISCLOSURE

The present disclosure generally relates to networking systems and methods. More particularly, the present disclosure relates to systems and methods for performing convergence in a section of a network having a ring topology using Label Distribution Protocol (LDP).

BACKGROUND OF THE DISCLOSURE

In a network environment, the topology (or architecture) of a subnet (or section of a network) is a collection of information regarding the nodes (e.g., routers, switches, etc.) that currently exist in the subnet as well as the available links that are being used to interconnect the nodes. It should be understood that knowledge of this topology is needed before routes or paths can be planned through the subnet for transmitting packets. Thus, a "discovery" process may be used for determining the present network topology. Discovery may include steps whereby each of the nodes shares its own information with the other nodes as well as its current knowledge of the other nodes and links within the subnet. This discovery process, in some cases, may lead to "convergence," which refers to a state where all of the nodes share the same topological information and therefore agree with one another regarding the actual state of the subnet regarding what nodes are present in the subnet and how they are connected. Once convergence is achieved, it is possible to route packets through the subnet as needed. For example, Interior Gateway Protocol (IGP) is a routing protocol that relies on convergence within the subnet in order to operate properly.

It may also be noted that the topology of a subnet may change over time, which essentially breaks the convergence temporarily until it can be re-established with the latest information. For example, if one or more nodes or links are added or removed from a subnet, additional discovery processes may be needed to achieve convergence again. Also, if it is determined that one or more links include a fault or is unavailable for any other reason, then this information may be communicated throughout the subnet to achieve convergence.

Currently, there are a number of conventional techniques for performing convergence. For example, some of these techniques include Prefix-Independent Convergence (PIC), Loop-Free Alternate (LFA), Remote LFA (RLFA), Topology-Independent LFA (TI-LFA), etc. Some conventional techniques may also include micro-loop avoidance solutions in order to avoid micro-loops in the subnet.

However, the conventional solutions are typically overly complex and cannot be supported by Application-Specific Integrated Circuits (ASICs). Therefore, there is a need in the field of performing convergence in a subnet (or other specifically defined section of a network) in a manner that simplifies the process, avoids the complexity of conventional solutions, and provides fast and efficient convergence, particularly in a subnet where one or more rings are present.

BRIEF SUMMARY OF THE DISCLOSURE

In various embodiments, the present disclosure includes a method having steps, a system including at least one processor and memory with instructions that, when executed, cause the at least one processor to implement the steps, a node in a network configured to implement the steps, and a non-transitory computer-readable medium having instructions stored thereon for programming at least one processor to perform the steps. The steps include performing a convergence procedure to discover the topology of a network in which multiple nodes are arranged; and, upon determining that the topology of the network is a ring topology whereby the node is connected to two neighboring nodes by a respective link, creating a first table for a first link, the first table including labels representing at least a portion of a label stack for allowing the node to transmit packets to another node in the network in an clockwise (CW) direction around the ring; and creating a second table for a second link, the second table including labels representing at least a portion of a label stack for allowing the node to transmit packets to another node in the network in an anti-clockwise (ACW) direction around the ring.

The first and second tables can be created while performing the convergence procedure. The steps can further include utilizing the first table when packets are received over the first link connected to a first neighboring node oriented in the ACW direction from the node; and utilizing the second table when packets are received over the second link connected to a second neighboring node oriented in the CW direction from the node. The steps can further include detecting when one of the first link and the second link is unavailable, and restart a new convergence procedure based on the unavailable and replace the label stack corresponding with one table of the first and second tables to the label stack corresponding with the other table of the first and second tables.

The convergence procedure can include Label Distribution Protocol (LDP) and allows the node to share its prefix with the other nodes of the network to be allocated in the first and second tables of the other nodes of the network. The steps can further include upon determining that the topology of the network includes multiple rings, creating one or more additional tables for the node configured in two or more of the multiple rings. The steps can further include communicating information regarding a preferred ring of the multiple rings and a preferred direction of the CW and ACW directions. The first and second tables can be Multiprotocol Label Switching (MPLS) tables configured to define Label Switched Paths (LSPs). The first and second tables can be configured on Layer 3 for the transmission of Internet Protocol (IP) packets. The first and second tables can be created without using a Ring Protection Link (RPL).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for performing discovery steps to achieve convergence in a subnet or other defined section of a communications network. The present disclosure is specifically configured to simplify convergence in a network (or subnet) having a ring topology where three or more nodes are connected by suitable links in a loop. In some embodiments, the present disclosure may refer to subnets where there is a single ring or loop, whereby other embodiments may refer to subnets having two or more rings or loops. The rings may be configured according to ITU G.8032—Ethernet Ring Protection Switching, whereby version 1 refers to single ring topology and version 2 refers to multiple ring (or ladder) topology.

Normally, convergence may be associated with Layer 2 (i.e., the data link layer) of the Open Systems Interconnection (OSI) model regarding the transmission of Ethernet frames. However, according to some embodiments of the present disclosure, convergence may be associated with Layer 3 (i.e., the network layer) convergence regarding IP packets.

The systems and methods of the present disclosure are configured for creating convergence in networks (or subnets) having a ring topology and are configured to eliminate the need for complex implementations, such as conventional fast convergence mechanisms (e.g., Prefix-Independent Convergence (PIC), Loop-Free Alternate (LFA), Remote LFA (RLFA), Topology-Independent LFA (TI-LFA), etc.) and/or conventional micro-loop avoidance mechanisms. Also, the embodiments of the present disclosure are configured to improve upon the conventional methods to achieve better convergence results without the need for these conventional techniques. In addition, the embodiments of the present disclosure are not limited by the size of the label stack, which is an issue with some conventional platforms that cannot support label stacks larger than three, thereby making it difficult for these conventional platforms to support PIC, LFA, micro-loop avoidance mechanisms, etc.

Single Ring

Figure 1:
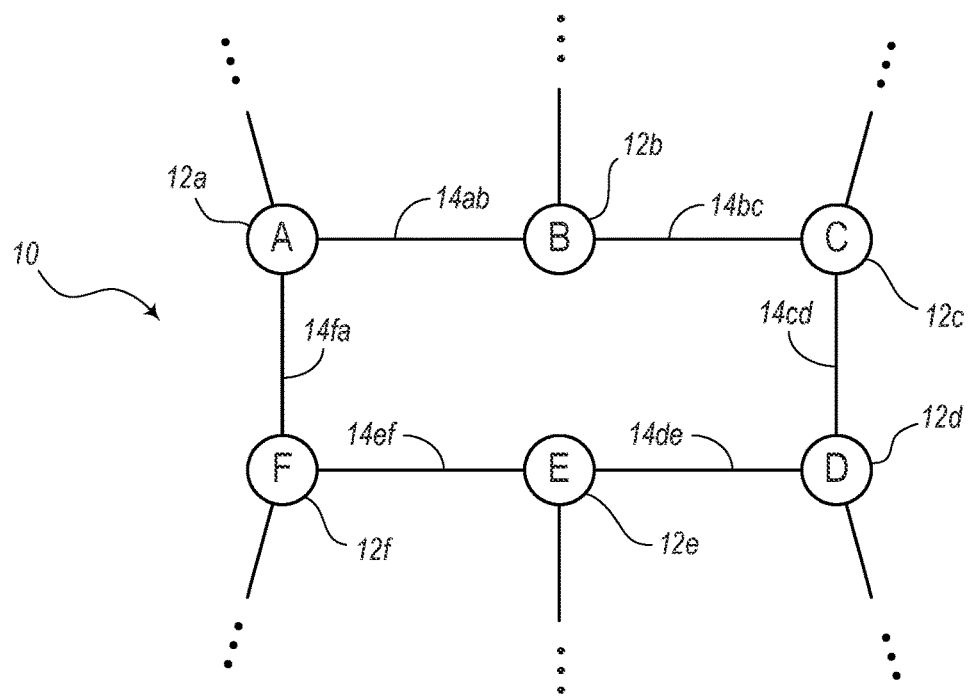
FIG. 1 is a diagram illustrating a section of a network where the nodes are arranged in a ring topology, according to various embodiments.

FIG. 1 is a diagram illustrating an embodiment of a subnet 10 (or section of a network) where nodes 12a, 12b, 12c, 12d, 12e, 12f are arranged in a ring topology. For example, nodes 12a, 12b, 12c, 12d, 12e, 12f in the present disclosure may also be referred to as Node A, Node B, Node C, Node D, Node E, and Node F, respectively. For example, the ring topology in this embodiment includes not only the Nodes A, B, C, D, E, F, but also links 14ab, 14bc, 14cd, 14de, 14ef, 14fa connecting the nodes 12 in a loop. It may be noted, for example that link 14ab is configured to connect Nodes A and B to enable bidirectional communication between these nodes 12 (i.e., node 12a and 12b). Link 14bc is configured to connect Nodes B and C, link 14cd is configured to connect Nodes C and D, and so on. The links 14, for example, may be referred to or may be configured as interfaces, fibers, fiber optic cables, lines, connectors, etc. The topology of FIG. 1 may be defined as a Fixed Telecom Network (FTN), where communication includes physically connected (non-wireless) components.

In addition to the connection to links 14 within the ring, each of the Nodes A, B, C, D, E, F may also be connected to end user devices, servers, edge devices, other subnets, Border Gateway Protocol (BGP) devices or networks, etc. In the examples described in the present disclosure, particularly with respect to communications between peer Nodes A and E, it should be noted that an end user device connected to Node A may attempt to communicate with a server connected to Node E, for example.

When the nodes 12 and links 14 in the subnet 10 are operating properly (e.g., when there are no faults, no disconnections, etc.), then it may be understood that any node 12 may communicate with any other node 12 in the subnet 10 in either a clockwise (CW) direction around the ring or an anti-clockwise (ACW) or counter-clockwise direction. According to embodiments whereby the link cost of each link 14 is the same, it may be noted that communication between node 12a and node 12d can be directed in either the CW direction (i.e., A-B-C-D) or ACW direction (i.e., A-F-E-D) with essentially the same cost and same number of hops. Also, for communication from node 12a to either of nodes 12b, 12c, it may be more efficient to route packets in the CW direction, and communication from node 12a to either of nodes 12f, 12e may be more efficient in the ACW direction. Note, as described herein CW and ACW are meant as logical representations of directions associated with the ring meaning each represents a flow in a separate direction from the other around the ring. These are not meant to be exact, meaning in some embodiments, ACW could physically be clockwise and vice versa for CW being anti-clockwise. Stated differently, CW is a first direction around the ring and ACW is a second, opposite direction around the ring.

When convergence is achieved within the subnet 10 and all the links 14 are available for packet transmission according to a routing plan, then the subnet 10 is configured to operate normally. In the embodiment of FIG. 1, whereby the subnet 10 includes a ring topology, convergence will reveal the fact that the subnet 10 includes the nodes 12a, 12b, 12c, 12d, 12e, 12f connected in a ring. For example, convergence may include the sharing of prefix information or address information of each of the nodes 12 and how each node 12 is connected to two other adjacent nodes 12, where one adjacent node 12 is oriented in a CW perspective in the ring and the other adjacent node 12 is oriented in a ACW perspective in the ring. For communication to a destination node, a source node is configured to use a destination prefix (associated with the destination prefix) to instruct any intermediate nodes to transmit the packets in a consistent direction (CW or ACW) until the packets reach the destination node.

Figure 2:
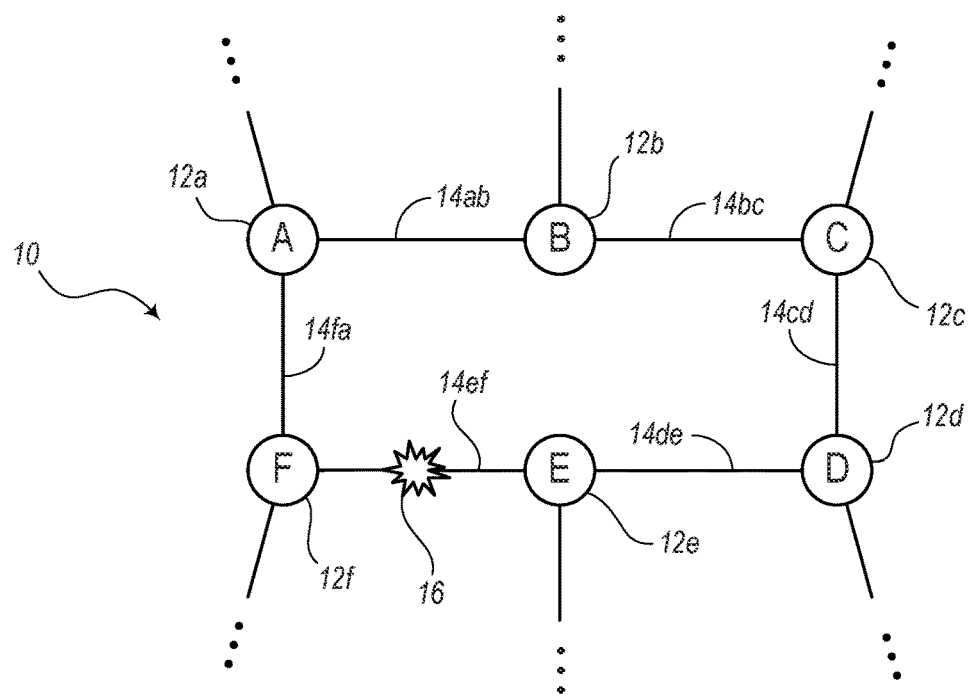
FIG. 2 is a diagram illustrating the section of the network of FIG. 1 where a link interconnecting two nodes is unavailable, according to various embodiments.

FIG. 2 is a diagram illustrating an embodiment where the subnet 10 of FIG. 1 includes a condition where one of the links (i.e., link 14ef between Nodes E and F) is unavailable. For example, the link 14ef may be unavailable due to various condition, such as a break in the link 14ef, the link 14ef experiencing a large amount of traffic, the link 14ef being disconnected from a port associated with Node E or Node F, etc. As a result, it may be beneficial in this case to avoid the process of attempting communication along this link 14ef. For example, if Node F intends to transmit packets to Node E but is also aware that link 14*ef* is down, then instead of Node F sending the packets in the ACW direction directly to Node E, Node F will instead send the packets to Node E in the CW direction through intermediate nodes 12*a*, 12*b*, 12*c*, 12*d*, thereby re-routing the packets around the ring in the opposite direction.

Any destination prefix is reachable on any node 12 via an adjacent CW or ACW link 14 or interface. When sending packets labeled for communication to a destination node 12 in either the CW or ACW direction, a Multiprotocol Label Switching (MPLS) label advertised by the CW or ACW node may be used.

Label Distribution Protocol (LDP) may be implemented in an unsolicited downstream manner. In this case, LDP can enable each node 12 to learn the two labels from both of its immediate neighbors or peers (e.g., adjacent nodes) on the ring, wherein the labels may include the associated prefixes or addresses. Also, LDP may include the discovery whereby each node is able to learn the prefixes of other nodes that are not immediately connected. In this case, the prefixes can be passed around the ring (in both directions) to allow each node to learn the prefixes of all nodes in the ring.

LDP is a protocol in which nodes 12 (or routers) are capable of MPLS communication to exchange label mapping information. Any two nodes 12 in the ring, referred to as LDP peers, can establish a session and exchange information bi-directionally between the LDP peers. Also, in the embodiments of the present disclosure with the ring topology, the LDP peers can also exchange information in both the CW and ACW directions. In this way, the LDP peers can obtain relevant information around the entire ring and share this information with the other nodes 12. Tables can be built and maintained to include a database of Label Switched Paths (LSPs) that can be used to forward traffic through MPLS networks (e.g., subnet 10). Each node in the ring will allocate a label for each reachable destination node/router and distribute that to the neighboring routers in the ring, each node will build 2 or more MPLS tables, one for each interface that is part of one or more rings in.

Also, based on the link 14 from which packets are received, a node 12 is configured to utilize the appropriate MPLS table for continuing transmission in the same direction (if possible). As an example, if Node A receives packets from Node B along link 14*ab*, Node A is configured to determine that the packets are received on a specific port connected to the link 14*ab*. By knowing that Node B is oriented in a CW perspective with respect to Node A and the packets are routed in a ACW direction, Node A is configured to use the ACW table (for interface associated with incoming traffic on link AB) for continuing transmission in the ACW direction. For example, Node A in this case is configured to forward the packets to the neighboring node (i.e., Node F).

According to another example, suppose Node A attempts to reach Node E (and assume again that the link costs of all links 14 are equal), the ACW links 14*fa* and 14*ef* would normally be used when there are no failures along this path. To create the ACW table, whereby Nodes A and E are configured as "peer" node attempting to establish a route. In this case, Node A allocates label A (for prefix of Node E) NODE E and is configured to learn label F (for Node E) from Node F and label B (for Node E) from Node B.

It may be noted that the last entry in the bottom row of each table include the same prefix or label as the node itself on which this information in stored. This extra entry may be used simply for the discovery process to share information to other nodes, especially since a node typically does not need to loop around the entire ring to return back to itself. Thus, in some embodiments, the last row of entries may be omitted from the tables.

Node B may be configured to allocate (or program) label B (for prefix Node E) and learn label A (for Node E) from Node A and label C (for Node E) from Node C. Node C may be configured to allocate label C (for prefix Node E) and learn label D (for Node E) from Node D and label B (for Node E) from Node B. Node D is configured to allocate label D (for prefix Node E) and learn label E (for Node E) from Node E and label C (for Node E) from Node C. Node E may be configured to allocate label E for prefix Node E, which may be an implicit NULL. Node F may be configured to allocate label F (for prefix Node E) and learn label E (for Node E) from Node E and label A (for Node E) from Node A. Node F (in the FTN topology) for Node E may include a primary path via Node E (using label E) and a backup path via Node A (using label A).

Node A may be configured to allocate (or program) incoming label A in the two MPLS tables. The "Node A" portion of the first MPLS table (for use by Node A) is configured for receiving packets along the link 14*ab* (from Node B) and the "Node A" portion of the second MPLS table (for use by Node A) is configured for receiving packets along the link 14*fa* (from Node F). In the first MPLS table, incoming label A is configured to point to the next hop to Node F (using label F). In the second MPLS table, incoming label A is configured to point to the next hop to Node B (using label B).

Between any two nodes 12 in the ring, the embodiments of the present disclosure may use a Link Aggregation Group (LAG) or parallel Layer 3 links or interfaces. If more than one Layer 3 link connects two nodes, then the MPLS table may be associated with the links in the CW direction and the second MPLS table may be associated with links in the ACW direction.

Referring again to FIG. 2, suppose Node A is attempting to reach Node E and the link 14*ef* includes a fault 16 or other condition making the link 14*ef* unavailable or impractical. When the link 14*ef* goes down, Node F may be configured to trigger protection on the subnet 10 and immediately send the packet back to Node A with label A on the CW link (i.e., link 14*fa*) prior to Node A detecting the topology change and converging. Node A is configured to receive the information of the second MPLS table from the direction of the link 14*fa* and is configured to look up the MPLS packet in the table associated with MPLS table to send the packet in the CW direction towards Node B. Then, Node B is configured to receive the MPLS packet on link 14*ab* (or interface), look up the MPLS packet in the table associated with link 14*ab*, and send the packet in the CW direction towards Node C, and so on.

In the case where the link 14*ef* is restored and packets can be transmitted between Nodes E and F, the nodes again are configured to perform convergence to relearn the restored subnet 10. The condition of the subnet 10 shown in FIG. 1 may therefore be considered to be relevant.

In the "link up" case, any destination prefix may be reachable on any router via CW or ACW links or interfaces. When sending the packets labeled to any destination clockwise or anti-clockwise, the MPLS labels advertised by the CW or ACW node may be used. When link 14*ef* was down (prior to the link 14*ef* being "up" or restored), Node A would utilize links 14*ab*, 14*bc*, 14*cd*, and 14*de* to reach Node E, which of course bypasses the faulty link and proceeds around the ring in the opposite direction from the "preferred" direction. Then, when the link 14*ef* is up, the nodes may converge on the newly restored topology, which may occur in any order. Any node receiving packets in the CW or ACW directions can look up the packet in the correct MPLS table associated with the link from which the packets were received. In some embodiments, the nodes 12 may forward the packet clockwise until the packet reaches the destination node on the ring.

Again, each node 12 in the ring is configured to allocate or program the two MPLS tables. The CW table is used when packets are received clockwise and the ACW table is used when packets are received anti-clockwise. Based on the labels in the tables, the nodes are configured to continue transmitting the packets in the same CW or ACW direction around the ring as they are received until the destination is reached.

Corresponding portions of the two MPLS tables will be populated on all the respective nodes with the same MPLS incoming labels. However, in the first table (clockwise table), the ingress labels will be pointing in the CW direction in order to direct the route toward the next CW hop link, and whereby the second table (anti-clockwise table) includes the ingress labels pointing in the ACW direction to direct the route toward the next ACW hop link. If packets arrive over the ACW link, then the ACW table is used. If packets arrive over the CW link, then the CW table is used. The MPLS tables may be programmed with the best Interior Gateway Protocol (IGP) path and label as the primary path and with a backup pointing in the opposite direction for the next hop.

Multiple Rings

Figure 3:
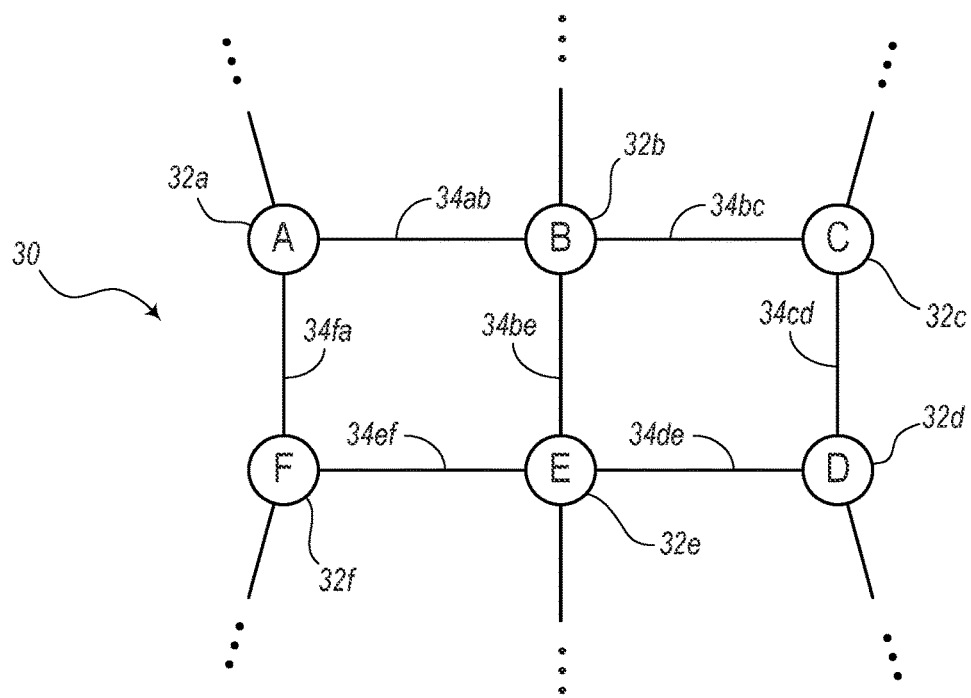
FIG. 3 is a diagram illustrating the section of the network of FIG. 1 where the nodes are arranged in a topology having two rings, according to various embodiments.

FIG. 3 is a diagram illustrating an embodiment of another subnet 30, similar to the subnet 10 shown in FIGS. 1 and 2. In this embodiment, the subnet 30 includes nodes 32a, 32b, 32c, 32d, 32e, 32f (i.e., Nodes A, B, C, D, E, F) arranged in a topology having two rings. For example, the first ring in this example includes Nodes A, B, E, and F, and the second ring in this example includes Nodes B, C, D, and E. It may be noted that Nodes B and E are used for creating both rings. In particular, to create the two rings with respect to the arrangement shown in FIGS. 1 and 2, the subnet 30 includes an extra link 34be between Nodes B and E. Also, the subnet 30 includes links 34ab, 34bc, 34cd, 34de, 34ef, 34fa, and 34be.

Figure 4:
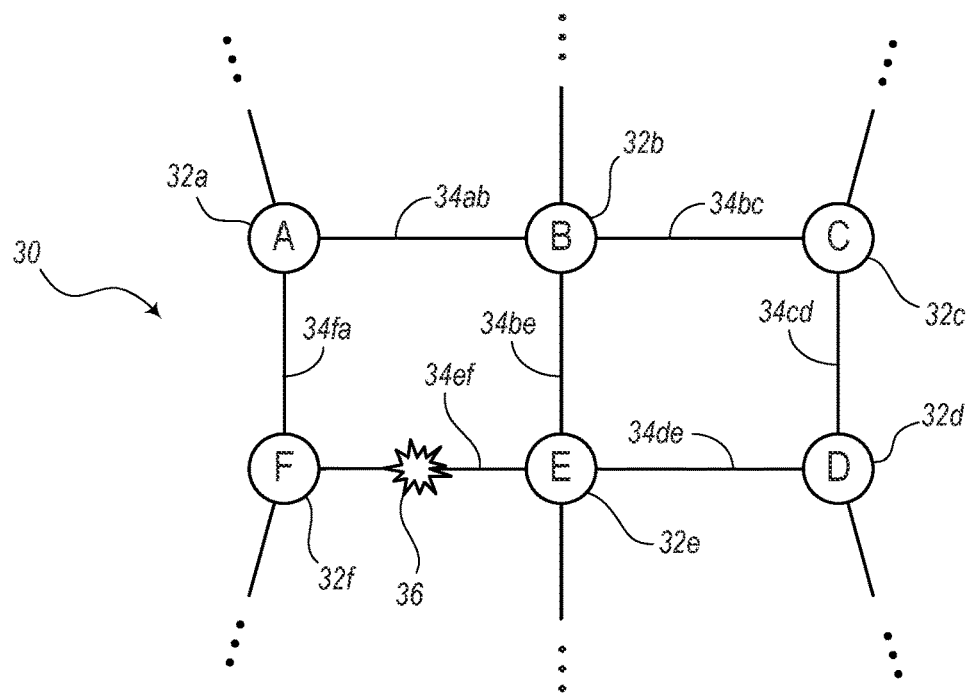
FIG. 4 is a diagram illustrating the section of the network of FIG. 3 where a link interconnecting two nodes is unavailable, according to various embodiments.

FIG. 4 is a diagram of the multiple ring topologies of the subnet 30 of FIG. 3, whereby one of the links (i.e., link 34ef) interconnecting Nodes E and F is unavailable (e.g., faulty, disconnected from a port of Node E, disconnected from a port of Node F, congested because of excessive traffic, etc.). Again, in these examples, the link costs of each of the links 34 may be assumed to be the same.

To reach Node D from Node A, links 34ab, 34bc, 34cd may be used for transmission in the CW direction. This may be the preferred route when there are no failures (as shown in FIG. 4). With LDP downstream unsolicited, Nodes B and E, which participate in more than one ring, will have more than two links 34 associated with rings. In this case, Node B is connected to links 34ab, 34bc, 34be and Node E is connected to links 34de, 34be, 34ef. The nodes 32 are configured to learn labels from neighbors on the rings for all prefixes, similar to the processed described with respect to FIGS. 1-2. However, instead of two tables associated with each node, Nodes B and E (i.e., connected to multiple rings) may be configured to store one MPLS label table per link (or interface) on any ring. In other embodiments, Nodes B and E may include three tables—one per interface connected to the 2 rings.

For example, Node B may be configured to allocate (or program) label B for prefix Node D and also learn label C (for Node D) from node C, label A (for Node D) from Node A, and label E (for Node D) from Node E. Node E may be configured to allocate label E (for prefix Node D) and also learn label F (for Node D) from Node F, label D (for Node D) from Node D, and label B (for Node D) from Node B. In some embodiments, Node F (in the FTN subnet 30), for Node D primary path, via Node E, label E, and backup via Node A, label A.

Node A, which is configured to participate in a single ring in this embodiment, is configured to program incoming label A in the two MPLS tables related to ring 1. The first MPLS table may be used when Node A receives packets on link 34fa and the second MPLS table may be used when Node A receives packets on link 34ab. The first table with incoming label A will point to the next hop of Node B (label B). In some embodiments, a backup path may be included for transmission in the opposite direction with Node F, label F as the next hop. The second MPLS Table has incoming label A and points to next hop Node F (label F). In some embodiments, a backup path may be included for transmission in the opposite direction with Node B, label B as the next hop.

Node B, which is configured to participate in two different rings in this embodiment, may be configured to program incoming label B in three different MPLS tables. In this case, a first table may be used when packets are received on link 34ab, a second table may be used when packets are received on link 34be, and a third table may be used when packets are received on link 34bc. For example, the first table, with incoming label B, may be configured to point to Node E, label E (e.g., with backup Node C, label C). The second table, with incoming label B, may be configured to point to Node C, label C (or to Node A, label A) (e.g., with backup Node A or Node C, respectively). This second table may be based on knowledge of each of the two rings. The third table, with incoming label B, may be configured to point to Node E, label E (e.g., with backup Node A, label A.

In other embodiments, Node B may include three MPLS tables for directing where the packets are traveling and further based on the incoming interface and the ring on which the packets are traveling. Similarly, Node E, which participate in the two rings, may have three tables depending on which link 34be, 34de, 34ef packets are traveling.

Referring again to FIG. 4, when a fault 36 is detected on link 34ef (or when other condition occurs that prevents packets from being adequately transmitted between Nodes E and F), alternate paths may be used, depending on reversing the direction around the same ring and/or by utilizing the other ring, as needed to properly reach the intended destination.

If link 34ef goes down (e.g., due to fault 36), Node F may trigger a protection path and immediately send a packet intended for Node E back to Node A with label A on the link 34fa (or interface) prior to Node A detecting the topology change (e.g., due to the fault 36) and converging. Node A receives the MPLS packet on the link 34fa, looks up the next hop on the MPLS table associated with link 34fa and finds (i.e., label B) and sends the packet to Node B. Node B receives the MPLS packet on link 34ab, looks up the next hop on the table associated with link 34ab and sends the packet to Node E. Node E (i.e., the destination node) receives the MPLS packet on link 34be. In a situation where there is a fault in a link (e.g., link 34be) that is common to two or more different rings, then the systems and methods of the present disclosure may be configured to use backup paths to allow moving from one ring to another.

When the fault 36 is detected on link 34*ef*, Node A may attempt to reach Node E, for example. In this case, transmission may begin in the preferred manner (i.e., ACW to Node F). However, when Node F detects the fault 36, Node F triggers protection and the packets are sent back to Node A in the CW direction and Node A, using the MPLS table associated with link 34*fa* Node A forwards the packets to the next hop Node B, and so on, until the destination node (i.e., Node E) is reached.

When the link 34*ef* recovers from the fault 36 (e.g., the fault 36 is repaired, cables are reconnected, etc.), Node F may discover that link 34*ef* that is available again and begins another LDP process to share topology information, again leading to convergence upon the changed topology (e.g., repaired or restored link 34*ef*). Nodes receiving packets may look up the next hop in the corresponding MPLS tables associated with receiving on a specific link and then and forward the packet in the same direction until the packet reaches the destination node on the ring.

Each node on either of the rings may be configured to allocate or program the MPLS table(s) associated with each link(s) attached to the rings (or alter the tables based on topology changes). The next hops are configured per link on any ring and can be used when packets are received on the respective link or interface. For example, packets received on a link 34 on any ring may be analyzed by the respective node 32, which may then look at the associated MPLS table. If packets are received in the CW or ACW direction, the next nodes 32 on the path are configured to forward in the same direction until the destination is reached. Thus, the MPLS tables are configured to direct the packets in the same direction not to create loops, unless there is a faulty or unavailable link, where, in this case, the detecting node can reverse the direction by switching to the information on the other table for that ring and/or by switching the information to another ring if a link common to multiple rings is down. This process may be performed per ring and per direction. The MPLS tables can be populated for all nodes 32 with the same MPLS incoming labels. However, these incoming labels may be pointing to other links 34 on the rings other than the incoming link 34 associated with the MPLS table. The MPLS tables may be programmed with the best IGP path+label as a primary and with the backup pointing to one of the other interfaces on the rings.

Figure 5:
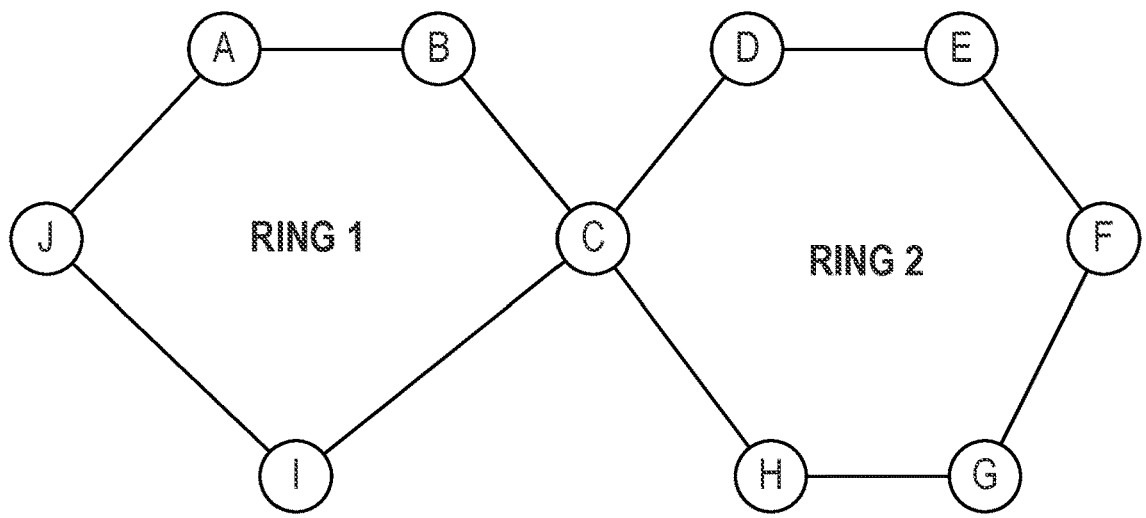
FIG. 5 is a diagram illustrating a section of a network where nodes are arranged in a topology having two rings and where there is no common link between the two rings, according to various embodiments.
Figure 6:
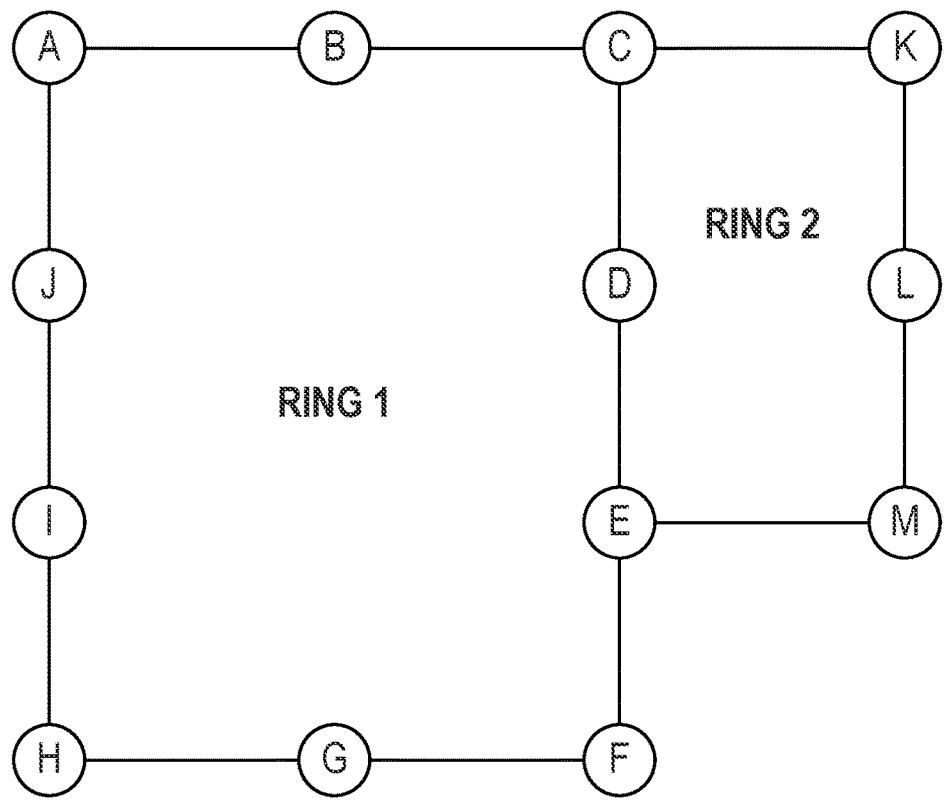
FIG. 6 is a diagram illustrating a section of a network where nodes are arranged in a topology having two rings and where there are two common links between the two rings, according to various embodiments.

FIG. 5 is a diagram illustrating an embodiment of a subnet 50 where nodes are arranged in a topology having two rings. However, in contrast to FIGS. 3 and 4, there is no common link (e.g., link 34*be*) in the subnet 50. It should be noted that MPLS tables may be created in a comparable manner for determining next hop information for each node based on the ring (or rings) in which the packets are being transmitted and the CW and/or ACW direction around the rings in which the packets are being transmitted. Also, FIG. 6 is a diagram illustrating an embodiment of a subnet 54 where nodes are arranged in a topology having two rings. However, in this embodiment, there may be two links 56*cd*, 56*de* used by both rings. Therefore, the transmission from Node C to Node D along link 56*cd* may be in a CW direction when associated with ring 1 or may be in an ACW direction when associated with ring 2.

General Systems and Methods

Figure 7:
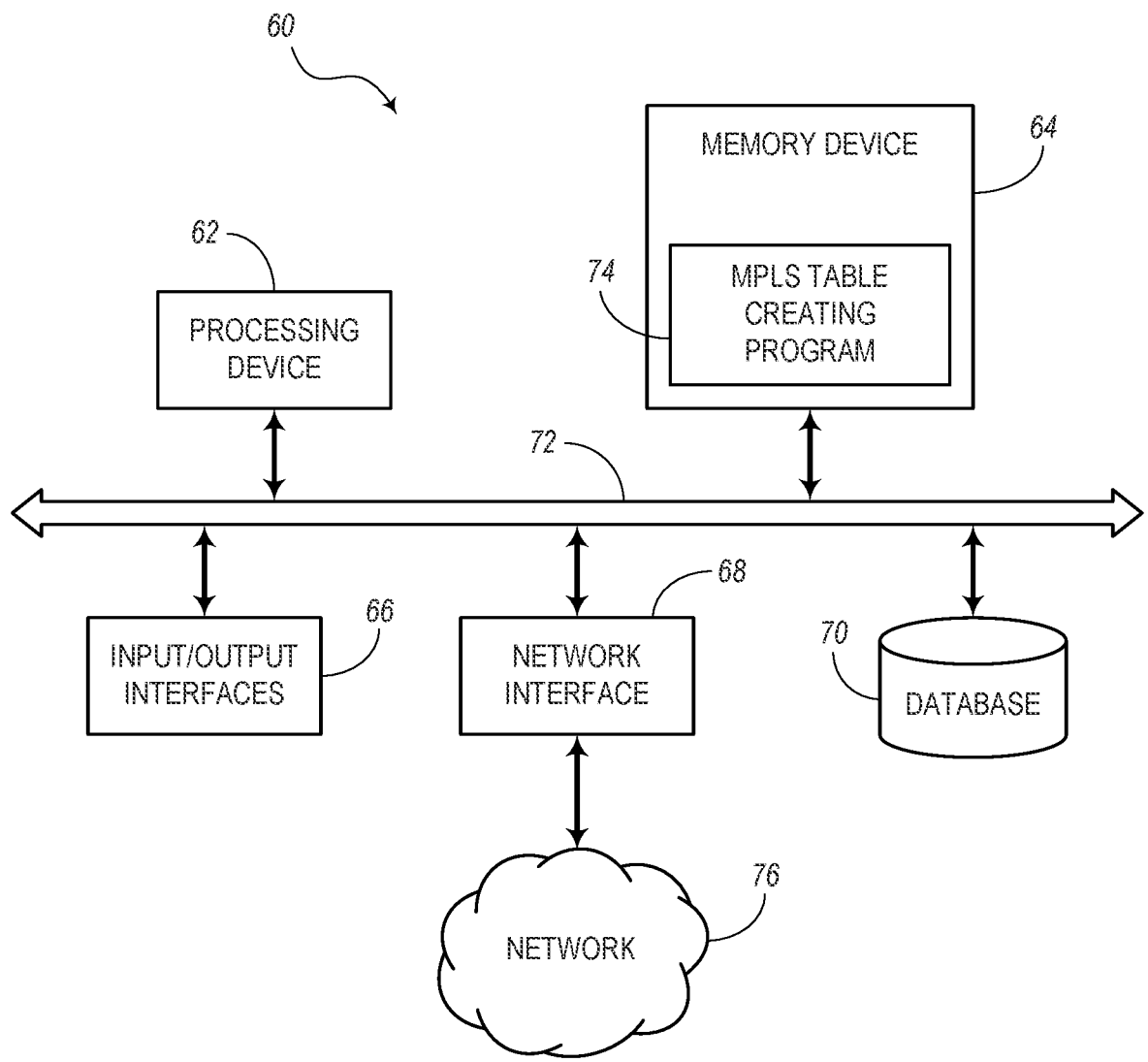
FIG. 7 is a diagram illustrating a computing system for creating MPLS tables, according to various embodiments.

FIG. 7 is a diagram illustrating a computing system 60 for creating MPLS tables in a discovery or convergence strategy. The computing system 60, as illustrated, may include a processing device 62, memory device 64, input/output interfaces 66, network interface 68, and a database 70, each interconnected via a local interface 72. The network interface 68 may be configured for communicating with a network 76 or subnet (e.g., subnet 10, 30) for communicating information for used to create MPLS tables. This can be achieved during a discovery stage or when the network 76 changes (e.g., due to a faulty or unavailable link). In some embodiments, the computing system 60 may represent each of the nodes (e.g., nodes 12, 32, etc.) in the network or subnet for performing convergence and for assisting with the creation of the MPLS tables. In other embodiments, the computing system 60 may be a control system for managing the nodes 12, 32 to create and distribute MPLS tables.

In some embodiments, the computing system 60 may include an MPLS table creating program 74 configured to gather information regarding the discovered topology of the network 76 (or subnet). The tables are created for storage on each respective node such that the next hop can be configured into a label stack or the like. Thus, the created tables may represent the currently determined topology and can be used to instruct the respective node to transmit packets based on a ring being used (if more than one ring is present in the topology) and also based on the continuing direction (CW or ACW) in which the packets are being transmitted. The MPLS table creating program 74 may be configured in any suitable combination of hardware (e.g., in the processing device 62) and software/firmware (e.g., in the memory device 64). Functionality of the computing system 60 may be associated with the process 80 described below with respect to FIG. 10.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Figure 8:
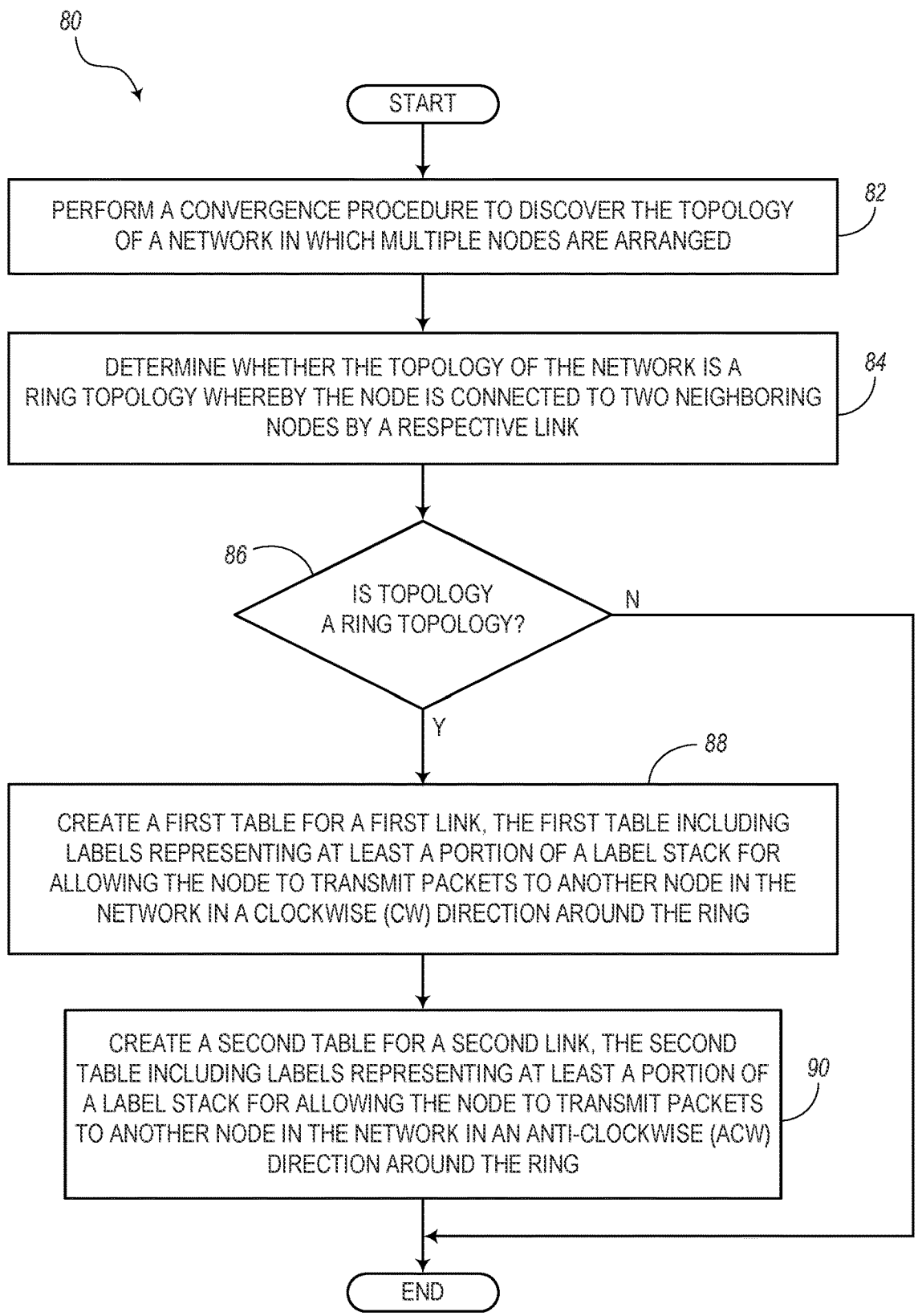
FIG. 8 is a flow diagram illustrating a process for creating MPLS tables in a network topology having one or more rings, according to various embodiments.

FIG. 8 is a flow diagram illustrating an embodiment of a process 80 for creating MPLS tables in a network topology having one or more rings. The process 80 can be realized as a method or via a node operating in the network. The process 80 includes performing a convergence procedure to discover the topology of a network in which multiple nodes are arranged (step 82); and upon determining (steps 84, 86) that the topology of the network is a ring topology whereby the node is connected to two neighboring nodes by a respective link, creating a first table for a first link, the first table including labels representing at least a portion of a label stack for allowing the node to forward received packets to another node in the network in a clockwise (CW) direction around the ring (step 88); and creating a second table for a second link, the second table including labels representing at least a portion of a label stack for allowing the node to forward received packets to another node in the network in an anti-clockwise (ACW) direction around the ring (step 90).

The first and second tables can be created while performing the convergence procedure. The process 80 can further include utilizing the first table when packets are received over the first link connected to a first neighboring node oriented in the CW direction from the node; and utilizing the second table when packets are received over the second link connected to a second neighboring node oriented in the ACW direction from the node. The process 80 can further include detecting when one of the first link and the second link is unavailable, and restart a new convergence procedure based on the unavailable and replace the label stack corresponding with one table of the first and second tables to the label stack corresponding with the other table of the first and second tables.

The convergence procedure can include Label Distribution Protocol (LDP) and allows the node to share its prefix with the other nodes of the network to be allocated in the first and second tables of the other nodes of the network.

The process 80 can further include upon determining that the topology of the network includes multiple rings, creating one or more additional tables for the node configured in two or more of the multiple rings. The process 80 can further include communicating information regarding a preferred ring of the multiple rings and a preferred direction of the CW and ACW directions. The first and second tables can be Multiprotocol Label Switching (MPLS) tables configured to define Label Switched Paths (LSPs). The first and second tables can be configured on Layer 3 for the transmission of Internet Protocol (IP) packets. The first and second tables can be created without using a Ring Protection Link (RPL).

Therefore, various embodiments of the present disclosure are discussed for creating MPLS tables used for instructing nodes to transmit packets in either the CW or ACW directions around a ring. Using the embodiments of the present disclosure, certain benefits may result. For example, the systems and methods may be able to achieve a superior network convergence and micro loop avoidance with a simple implementation with to networks with ring topologies. Also, it is possible to eliminate the need for conventional fast convergence mechanisms such as PIC, LFA, RLFA, TI-LFA, etc. Also, it is possible to eliminate need for any conventional micro loop avoidance mechanisms. Thus, the present disclosure provides a much simpler implementation for fast convergence and loop avoidance mechanisms. Also, the present embodiments are not limited by the size or length of the label stack, which can be a problem with certain conventional systems.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A node configured to operate in a network utilizing Multiprotocol Label Switching (MPLS), the node comprising circuitry configured to:
   perform a convergence procedure to discover the topology of a network in which multiple nodes are arranged, and
   upon determining that the topology of the network is a ring topology whereby the node is connected to two neighboring nodes by a respective link,
      create a first table associated with a first interface corresponding to a first link, the first table including labels representing at least a portion of a label stack for allowing the node to transmit packets to another node in the network in a clockwise (CW) direction around the ring,
      create a second table associated with a second interface corresponding to a second link, the second table including the labels representing at least a portion of a label stack for allowing the node to transmit packets to another node in the network in an anti-clockwise (ACW) direction around the ring, wherein the labels are ingress labels and are the same in both the first table and the second table except pointing in different directions around the ring, and
      receive packets on one of the first interface and the second interface, the packets arriving in one of the CW direction and the ACW direction and utilize either the first table or the second table for the received packets, when there are no failures, based on the interface on which the packetsare received.

2. The node of claim 1, wherein the first and second tables are created while performing the convergence procedure.

3. The node of claim 1, wherein the circuitry is configured to
   utilize the first table when the received packets are received over the first link connected to a first neighboring node oriented in the ACW direction from the node, and
   utilize the second table when the received packets are received over the second link connected to a second neighboring node oriented in the CW direction from the node.

4. The node of claim 1, wherein the circuitry is configured to
   detect when one of the first link and the second link is unavailable, and restart a new convergence procedure based on the unavailable links and replace the label stack corresponding with one table of the first and second tables to the label stack corresponding with the other table of the first and second tables.

5. The node of claim 1, wherein the convergence procedure includes Label Distribution Protocol (LDP) and allows the node to share its prefix with the other nodes of the network to be allocated in the first and second tables of the other nodes of the network.

6. The node of claim 1, wherein the circuitry is configured to
upon determining that the topology of the network includes multiple rings, create one or more additional tables for the node configured in two or more of the multiple rings.

7. The node of claim 6, wherein the circuitry is configured to
communicate information regarding a preferred ring of the multiple rings and a preferred direction of the CW and ACW directions.

8. The node of claim 1, wherein the first and second tables are Multiprotocol Label Switching (MPLS) tables configured to define Label Switched Paths (LSPs).

9. The node of claim 1, wherein the first and second tables are configured on Layer 3 for the transmission of Internet Protocol (IP) packets.

10. The node of claim 1, wherein the first and second tables are created without using a Ring Protection Link (RPL).

11. A method implemented by a node in a network utilizing Multiprotocol Label Switching (MPLS), the method comprising steps of:
performing a convergence procedure to discover the topology of a network in which multiple nodes are arranged; and
upon determining that the topology of the network is a ring topology whereby the node is connected to two neighboring nodes by a respective link,
creating a first table associated with a first interface corresponding to a first link, the first table including labels representing at least a portion of a label stack for allowing the node to transmit packets to another node in the network in a clockwise (CW) direction around the ring;
creating a second table associated with a second interface corresponding to a second link, the second table including the labels representing at least a portion of a label stack for allowing the node to transmit packets to another node in the network in an anti-clockwise (ACW) direction around the ring, wherein the labels are ingress labels and are the same in both the first table and the second table except pointing in different directions around the ring, and
receive packets on one of the first interface and the second interface the packets arriving in one of the CW direction and the ACW direction and utilize either the first table or the second table for the received packets, when there are no failures, based on the interface on which the packets are received.

12. The method of claim 11, wherein the first and second tables are created while performing the convergence procedure.

13. The method of claim 11, wherein the steps further include
utilizing the first table when the received packets are received over the first link connected to a first neighboring node oriented in the ACW direction from the node; and
utilizing the second table when the received packets are received over the second link connected to a second neighboring node oriented in the CW direction from the node.

14. The method of claim 11, wherein the steps further include
detecting when one of the first link and the second link is unavailable, and restart a new convergence procedure based on the unavailable links and replace the label stack corresponding with one table of the first and second tables to the label stack corresponding with the other table of the first and second tables.

15. The method of claim 11, wherein the convergence procedure includes Label Distribution Protocol (LDP) and allows the node to share its prefix with the other nodes of the network to be allocated in the first and second tables of the other nodes of the network.

16. The method of claim 11, wherein the steps further include
upon determining that the topology of the network includes multiple rings, creating one or more additional tables for the node configured in two or more of the multiple rings.

17. The method of claim 16, wherein the steps further include
communicating information regarding a preferred ring of the multiple rings and a preferred direction of the CW and ACW directions.

18. The method of claim 11, wherein the first and second tables are Multiprotocol Label Switching (MPLS) tables configured to define Label Switched Paths (LSPs).

19. The method of claim 11, wherein the first and second tables are configured on Layer 3 for the transmission of Internet Protocol (IP) packets.

20. The method of claim 11, wherein the first and second tables are created without using a Ring Protection Link (RPL).

* * * * *